(12) United States Patent
Suenobu et al.

(10) Patent No.: US 9,346,003 B2
(45) Date of Patent: May 24, 2016

(54) HONEYCOMB STRUCTURE

(75) Inventors: Hiroyuki Suenobu, Nagoya (JP); Koichi Sendo, Nagoya (JP); Takahiko Nakatani, Tajimi (JP); Takaya Yamaguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 148 days.

(21) Appl. No.: 13/611,435

(22) Filed: Sep. 12, 2012

(65) Prior Publication Data

US 2013/0071608 A1 Mar. 21, 2013

Related U.S. Application Data

(60) Provisional application No. 61/534,970, filed on Sep. 15, 2011.

(30) Foreign Application Priority Data

Jul. 24, 2012 (JP) .................................. 2012-163999

(51) Int. Cl.
B01D 46/24 (2006.01)

(52) U.S. Cl.
CPC ........ *B01D 46/2429* (2013.01); *B01D 46/2425* (2013.01); *B01D 46/2444* (2013.01); *B01D 2046/2433* (2013.01); *B01D 2046/2437* (2013.01); *B01D 2046/2496* (2013.01); *F01N 2330/06* (2013.01); *F01N 2330/60* (2013.01); *Y10T 428/24149* (2015.01)

(58) Field of Classification Search
CPC .................................................. B01D 46/2429
See application file for complete search history.

(56) References Cited

U.S. PATENT DOCUMENTS

| | | | |
|---|---|---|---|
| 4,329,162 A * | 5/1982 | Pitcher, Jr. .................... | 428/117 |
| 5,549,725 A * | 8/1996 | Kasai et al. .................... | 55/523 |
| 6,087,281 A | 7/2000 | Merkel | |
| 6,432,856 B1 | 8/2002 | Beall et al. | |
| 2003/0012923 A1 | 1/2003 | Beall et al. | |
| 2003/0024219 A1 | 2/2003 | Harada et al. | |
| 2004/0148916 A1 | 8/2004 | Merkel | |
| 2005/0069469 A1* | 3/2005 | Fu et al. ........................ | 422/180 |
| 2006/0210822 A1 | 9/2006 | Ono | |
| 2007/0141301 A1 | 6/2007 | Boorom et al. | |
| 2007/0190631 A1 | 8/2007 | Kreutzer et al. | |
| 2008/0237428 A1* | 10/2008 | Kobayashi ............ | C04B 35/565 248/346.06 |

(Continued)

FOREIGN PATENT DOCUMENTS

| EP | 0 661 088 A1 | 7/1995 |
|---|---|---|
| EP | 1 798 209 A1 | 6/2007 |

(Continued)

OTHER PUBLICATIONS

Extended European Search Report dated Mar. 6, 2013.

*Primary Examiner* — David Sample
*Assistant Examiner* — Nicholas W Jordan
(74) *Attorney, Agent, or Firm* — Burr & Brown, PLLC

(57) ABSTRACT

There is provided a honeycomb structure 100 comprising partition walls 1 separating and forming a plurality of cells 2 functioning as fluid passages. The partition walls 1 are made of cordierite, and, when an average pore size of the partition walls 1 is x (μm) while a porosity of the partition walls 1 is y (%), a relation of x and y is y≤−8.33x+86.66 and satisfies 0.5≤x≤5 and 35≤y≤70. The honeycomb structure 100 can improve thermal shock resistance without sacrificing any of light-off performance, catalyst coatability, and strength.

8 Claims, 4 Drawing Sheets

(56) References Cited

U.S. PATENT DOCUMENTS

| | | |
|---|---|---|
| 2008/0315468 A1 | 12/2008 | Ono |
| 2009/0041976 A1 | 2/2009 | Fu et al. |
| 2009/0220736 A1 | 9/2009 | Merkel |
| 2010/0129599 A1* | 5/2010 | Lu et al. ............... 428/116 |
| 2011/0203242 A1* | 8/2011 | Goto et al. ............... 55/523 |

FOREIGN PATENT DOCUMENTS

| | | |
|---|---|---|
| EP | 2 487 146 A1 | 8/2012 |
| JP | 2000-239059 A1 | 9/2000 |
| JP | 2001-205082 A1 | 7/2001 |
| JP | 2001-269585 A | 10/2001 |
| JP | 2003-502261 A1 | 1/2003 |
| JP | 2006-516528 A1 | 7/2006 |
| JP | 2006-256908 A | 9/2006 |
| JP | 2007-507667 A1 | 3/2007 |
| JP | 2007-525223 A | 9/2007 |
| JP | 2009-520677 A1 | 5/2009 |
| WO | 99/43629 A1 | 9/1999 |
| WO | 00/76939 A1 | 12/2000 |
| WO | 2005/084805 A1 | 9/2005 |
| WO | 2011/043434 A1 | 4/2011 |

* cited by examiner

HONEYCOMB STRUCTURE

BACKGROUND OF THE INVENTION

1. Field of the Invention

The present invention relates to a honeycomb structure. More specifically, the present invention relates to a honeycomb structure capable of improving thermal shock resistance without sacrificing any of light-off performance, catalyst coatability, and strength.

Cordierite ceramics shows low thermal expansion and has excellent thermal resistance and thermal shock resistance. Therefore, cordierite ceramics are widely used for a catalyst carrier for carrying an exhaust gas purification catalyst for a high temperature gas filter or an automobile engine by forming into a porous honeycomb shape. That is, honeycomb structures made of cordierite ceramics are widely used as gas filters or catalyst carriers.

It is required to obtain a honeycomb structure particularly more excellent in thermal shock resistance with the tightening of exhaust emission regulations and the improvement of engine performance.

2. Description of Related Art

For improving thermal shock resistance, the means such as reducing the thermal expansion coefficient of a honeycomb structure can be considered. For example, in Patent Documents JP-T-2003-502261, JP-A-2001-205082, JP-A-2000-239059, JP-T-2006-516528, JP-T-2009-520677, and JP-T-2007-507667, technologies to improve thermal shock resistance of a honeycomb structure are described.

In the technologies described in the aforementioned Patent Documents JP-T-2003-502261, JP-A-2001-205082, JP-A-2000-239059, JP-T-2006-516528, JP-T-2009-520677, and JP-T-2007-507667, there are a problem of reduction of light-off performance due to lower porosity of a honeycomb structure, and a problem of deterioration of catalyst coatability by lower porosity and smaller pore size. The light-off performance means a temperature property of the catalyst loaded on the honeycomb structure exhibiting the purification performance. In the technologies described in the aforementioned Patent Documents JP-T-2003-502261, JP-A-2001-205082, JP-A-2000-239059, JP-T-2006-516528, JP-T-2009-520677, and JP-T-2007-507667, there may be a problem of reducing strength due to higher porosity of a honeycomb structure, and a problem of rise of pressure loss of a honeycomb structure due to the limitation of practically usable cell structure resulted by reduced strength.

In a conventional honeycomb structure, thermal shock resistance and the aforementioned performances could not be satisfied at the same time. That is, in a conventional honeycomb structure, in order to improve thermal shock resistance, any of light-off performance, catalyst coatability, strength, and pressure loss is sacrificed.

SUMMARY OF THE INVENTION

The present invention has been made in view of such problems of prior art and aims to provide a honeycomb structure excellent in thermal shock resistance. In particular, there is provided a honeycomb structure capable of improving thermal shock resistance without seriously reducing any of light-off performance, catalyst coatability, and strength in comparison with a conventional honeycomb structure.

According to the present invention, there is provided a honeycomb structure shown below.

[1] A honeycomb structure comprising partition walls separating and forming a plurality of cells functioning as fluid passages, wherein the partition walls are made of cordierite, and, when an average pore size of the partition walls is x (μm) while a porosity of the partition walls is y (%), a relation of x and y is y≤−8.33x+86.66 and satisfies 0.5≤x≤5 and

[2] The honeycomb structure according to [1], wherein the relation of x and y further satisfies 35≤y≤45 and 0.5≤x≤5 or 45≤y≤70 and 0.5≤x≤2.

[3] The honeycomb structure according to [1] or [2], wherein the thermal shock resistance temperature is 650° C. or more.

[4] The honeycomb structure according to any one of [1] to [3], wherein A-axis compressive strength is 5.0 MPa or more.

[5] The honeycomb structure according to any one of [1] to [3], wherein the A-axis compressive strength is 7.0 MPa or more.

A honeycomb structure of the present invention is a honeycomb structure comprising partition walls separating and forming a plurality of cells functioning as fluid passages. The partition walls are made of cordierite, and, when an average pore size of the partition walls is x (μm) while a porosity of the partition walls is y (%), a relation of x and y is y≤−8.33x+86.66 and satisfies 0.5≤x≤5 and 35≤y≤70. A honeycomb structure of the present invention constituted in such a manner is excellent in thermal shock resistance. In particular, the honeycomb structure can improve a thermal shock resistance without seriously reducing any of light-off performance, catalyst coatability, and strength in comparison with a conventional honeycomb structure.

REFERENCE NUMERALS

1: partition wall, 2: cell, 3: outer peripheral wall, 11: one side end face, 12: the other side end face, 100: honeycomb structure

DETAILED DESCRIPTION OF THE INVENTION

Hereinbelow, embodiments of the present invention will be described. However, the present invention is by no means limited to the following embodiments. It should be understood that an embodiment obtained by suitably adding changes, improvements, or the like to the following embodiments on the basis of ordinary knowledge of a person of ordinary skill in the art within the range of not deviating from the gist of the present invention is included in the scope of the present invention.

Figure 1:
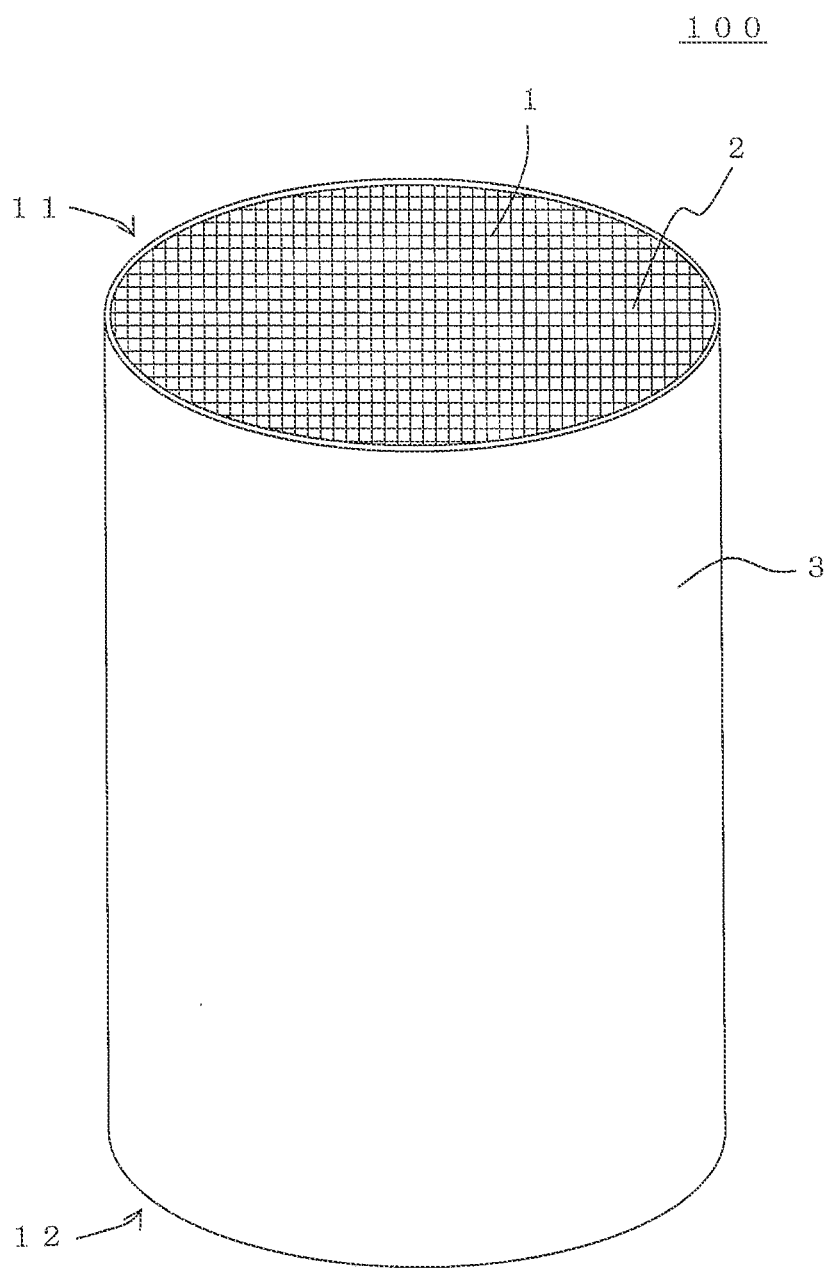
FIG. 1 is a perspective view schematically showing an embodiment of a honeycomb structure of the present invention.
Figure 2:
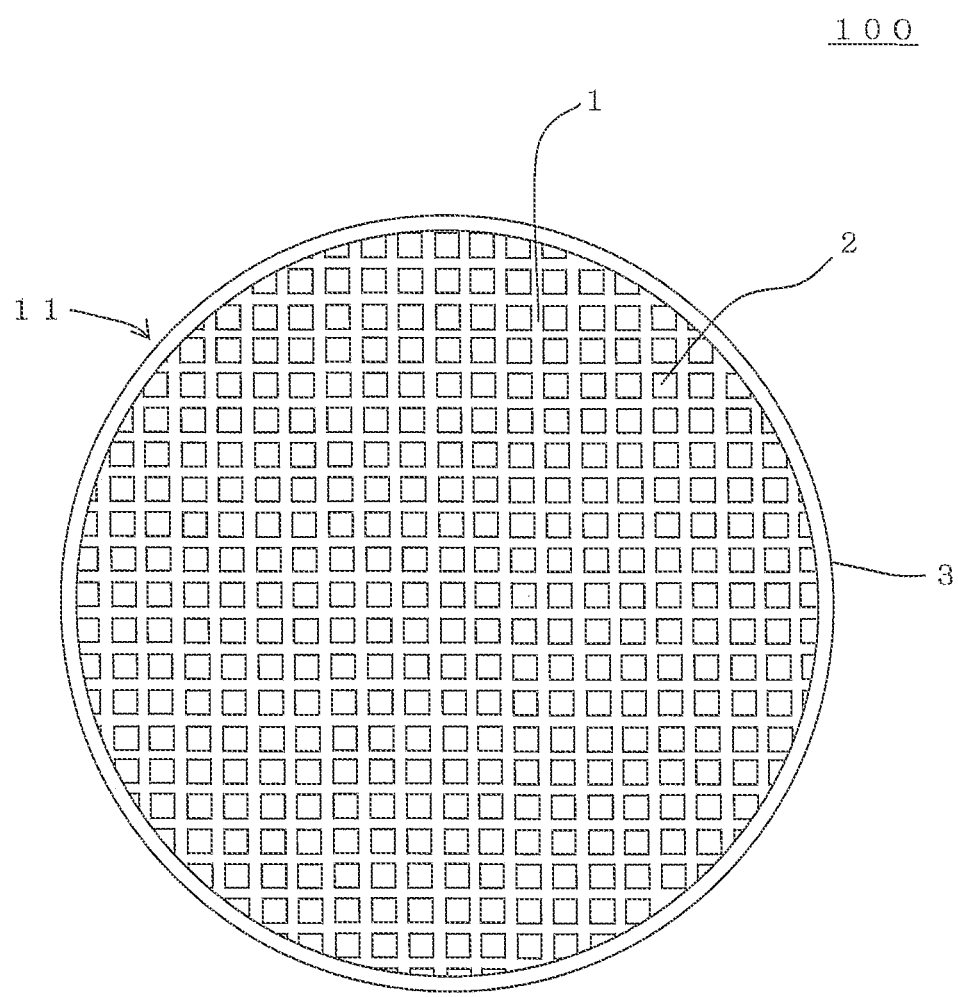
FIG. 2 is a plan view showing one end face side of an embodiment of a honeycomb structure of the present invention.
Figure 3:
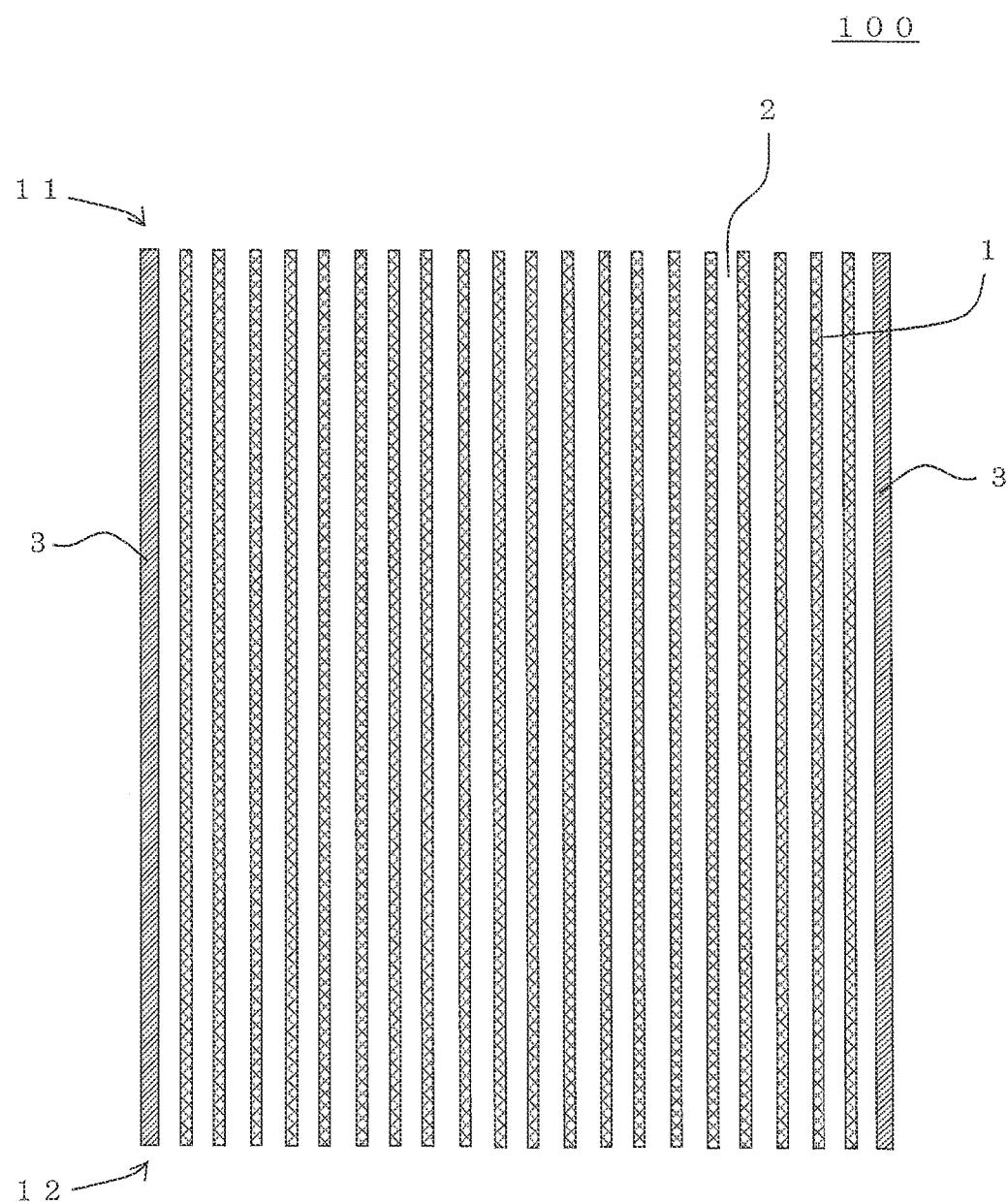
FIG. 3 is a schematic view showing a cross section parallel to the cell extending direction of an embodiment of a honeycomb structure of the present invention.

(1) Honeycomb Structure:

An embodiment of a honeycomb structure of the present invention is a honeycomb structure 100 provided with partition walls 1 for separating and forming a plurality of cells 2 functioning as fluid passages as shown in FIGS. 1 to 3. Here, FIG. 1 is a perspective view schematically showing an embodiment of a composite honeycomb structure of the present invention. The partition walls 1 are made of a porous material. That is, a plurality of pores are formed in the partition walls 1.

FIG. 2 shows a plan view showing and end face side of an embodiment of a honeycomb structure of the present invention. FIG. 3 is a schematic view showing a cross section parallel to the cell extending direction of an embodiment of a honeycomb structure of the present invention. FIGS. 1 to 3 show an example of a cylindrical honeycomb structure 100 having porous partition walls 1 separating and forming a plurality of cells 2 extending from one end face 11 to the other end face 12 and an outer peripheral wall 3 located in the outermost periphery.

In a honeycomb structure of the present embodiment, when an average pore size of the partition walls is x (μm) while a porosity of the partition walls is y (%), a relation of x and y satisfies y≤−8.33x+86.66. The aforementioned average pore size x of the partition walls is in the range of 0.5≤x≤5, and the porosity Y is in the range of 35≤y≤70. The formula "y≤−8.33x+86.66" is hereinbelow referred to as "formula (1)".

The honeycomb structure of the present embodiment constituted as described above has excellent thermal shock resistance. In particular, according to the honeycomb structure of the present embodiment, thermal shock resistance can be improved without seriously reducing any of light-off performance, catalyst coatability, and A-axis compressive strength in comparison with a conventional honeycomb structure.

In the honeycomb structure of the present embodiment, the "value of the average pore size of the partition walls" is a value measured by mercury intrusion technique. The average pore size and the porosity of the partition walls can be measured by a mercury porosimeter (e.g., Autopore 9500 (trade name) produced by Micromeritics Instrument Corporation).

When the aforementioned relation between x and y is y>−8.33x+86.66, either of the thermal shock resistance after loading a catalyst or the A-axis compressive strength may be low.

Even in the case that the relation between x and y satisfies the aforementioned formula (1), if the average pore size x of the partition walls and the porosity y of the partition walls are outside the aforementioned numeric ranges, any of light-off performance, catalyst coatability, and strength may be reduced.

In the honeycomb structure of the present embodiment, it is preferable that the relation of x and y further satisfies 35≤y≤45 and 0.5≤x≤5 or 45≤y≤70 and 0.5≤x≤2. That is, it is preferable that the porosity y of the partition walls is within the range of 35≤y≤45 while the average pore size x of the partition walls is within the range of 0.5≤x≤5 or that the porosity y of the partition walls is within the range of 45≤y≤70 while the average pore size x of the partition walls is within the range of 0.5≤x≤2.

In the honeycomb structure of the present embodiment, the A-axis compressive strength is preferably 5.0 MPa or more. This makes the honeycomb structure to have excellent thermal shock resistance and strength. In the honeycomb structure of the present embodiment, the A-axis compressive strength is more preferably 7.0 MPa or more.

The A-axis compressive strength means compressive strength (MPa) provided in JASO standard M505-87 which is an automobile standard issued by Society of Automotive Engineers of Japan. Specifically, it is fracture strength upon loading a compressive load in the flow passage direction, and the pressure at the time that the honeycomb structure is fractured is defined as "A-axis compressive strength". In the present specification, "strength of a honeycomb structure" is simply referred to, it means "A-axis compressive strength of the honeycomb structure".

In the honeycomb structure of the present embodiment, partition walls are made of cordierite. Such constitution enables to give a honeycomb structure having high A-axis compressive strength and excellent thermal shock resistance. In the cordierite constituting the partition walls, impurities usually contained may be contained. In the case that the partition walls contain at least one kind of ceramic selected from the group consisting of silicon carbide, aluminum titanate, zeolite, and mullite, by employing the constitution of the present embodiment, a honeycomb structure having high A-axis compressive strength and excellent thermal shock resistance can be also obtained.

Though there is no particular limitation on the thickness of the partition walls in the honeycomb structure of the present embodiment, the thickness is preferably 0.050 to 0.305 mm, more preferably 0.064 to 0.165 mm, particularly preferably 0.076 to 0.114 mm. Such constitution enables to obtain a honeycomb structure having high strength and reduced pressure loss.

The "thickness of the partition walls" means the thickness of a wall (partition wall) separating two adjacent cells in a cross section perpendicular to the cell extending direction of the honeycomb structure. As a method for measuring the "thickness of the partition walls", there is, for example, a method of measuring with an image analyzer ("NEXIV, VMR-1515" (trade name) produced by Nicon Corporation).

Though there is no particular limitation on the honeycomb structure shape of the present embodiment, preferred shapes are a circular cylindrical one, a cylindrical one having elliptic end faces, polygonal columnar ones having end faces each having a shape of "a square, a rectangle, a triangle, a pentagon, an octagon, and the like". FIGS. 1 to 3 show an example where the honeycomb structure 100 has a circular cylindrical shape. In the present specification, a circular cylindrical shape, a cylindrical shape having elliptic end faces, and a columnar shape having polygonal end faces may be referred to as "cylindrical shapes". Though the honeycomb structure 100 shown in FIGS. 1 to 3 has an outer peripheral wall 3, a honeycomb structure with no outer peripheral wall 3 may be employed. The outer peripheral wall 3 may be formed together with the partition walls 1 upon extruding a honeycomb formed body in a process for manufacturing the honeycomb structure 100. It is not necessary to form the outer peripheral wall 3 upon extrusion. For example, the outer peripheral wall 3 can be formed by applying a ceramic material to the outer periphery of the honeycomb structure 100.

There is no particular limitation on the cell shape (cell shape in a cross section perpendicular to the passage direction (cell extending direction) of the honeycomb structure) in the honeycomb structure of the present embodiment, and examples of the shape include a triangle, a quadrangle, a hexagon, an octagon, a circle, and a combination of them. Among quadrangles, a square and a rectangle are preferable.

In the honeycomb structure of the present embodiment, the cell density is preferably 15 to 140 cells/cm$^2$, more preferably 31 to 116 cells/cm$^2$, and particularly preferably 46 to 93 cells/cm$^2$. Such constitution enables to suppress the increase of pressure loss with maintaining the strength of the honeycomb structure.

In the honeycomb structure of the present embodiment, the thermal shock resistance temperature measured in a thermal shock resistance test is preferably 650° C. or more, more preferably 700° C. or more, particularly preferably 750° C. or more. Though there is no particular limitation on the upper value of the thermal shock resistance temperature measured in the thermal shock resistance test of the honeycomb structure of the present embodiment, it is rare that the thermal shock resistance temperature of a honeycomb structure satisfying the aforementioned formula (1) and having a practical shape and size exceeds 900° C. substantially. Thus, since the honeycomb structure of the present embodiment satisfies the aforementioned formula (1), excellent thermal shock resistant temperature of 650° C. can be realized.

The thermal shock resistance temperature is temperature providing an indication of evaluation for the thermal shock resistance and can be measured according to the following method. A honeycomb structure kept at room temperature is put in an electric furnace whose temperature is higher than the room temperature by a predetermined value (e.g., 700° C.) to carryout the thermal shock resistance test by the method shown in JASO standard M505-87. Three honeycomb structures were tested for each temperature. As the judgment criteria, the case having no crack generation and no other abnormality for all the three honeycomb structures and having no dull sound in a ping test is judged as having thermal shock resistance temperature of a predetermined value or more. The case having crack generation or having a dull sound in one or more honeycomb structures is judged as having thermal shock resistance temperature below the predetermined value. By changing the temperature of the electric furnace, the thermal shock resistance temperature to be measured can be selected.

Upon manufacturing the honeycomb structure of the present embodiment, it is preferable to select raw materials for manufacturing, for example, a honeycomb structure in such a manner that the relation between the average pore size x (μm) and the porosity y (%) satisfies the aforementioned formula (1). For example, by adjusting the particle diameter of raw materials for manufacturing a honeycomb structure, there can be manufactured a honeycomb structure whose the average pore size x (μm) of the partition walls and the porosity y (%) of the partition walls satisfies the aforementioned formula (1). It has been reported that, when S is fracture strength, ν is Poisson's ratio, E is Young's modulus, and α is thermal expansion coefficient, the thermal shock fracture resistance coefficient R is defined by "formula (2): $R=S(1-\nu)/E\alpha$". The formula (2) is shown in the "Ceramic Society of Japan, *Mechanical Properties of Ceramics*, Gihodo Shuppan (1979)". The aforementioned formula (2) indicate that, in order to obtain high thermal shock resistance temperature, it is necessary to make fracture strength higher and make Poisson's ratio, Young's modulus, and thermal expansion coefficient lower before and after the catalyst is loaded. In order to obtain a honeycomb structure having high fracture strength, low Poisson's ratio, and low Young's modulus, it is necessary to have small average pore size and high porosity. In addition, in order to make thermal expansion coefficient after loading a catalyst low, it is necessary that the following requirements (a) to (c) are satisfied. (a) The thermal expansion coefficient of a honeycomb structure before loading a catalyst is kept low. (b) The pore size is made small, while the porosity is made low, so that the bonding strength between a catalyst layer having a high thermal expansion coefficient and a honeycomb structure may be suppressed. (c) The size of pores exposed to the surface of the honeycomb structure (honeycomb substrate), the amount of the exposed pores, and the communication of the pores exposed to the surface of the honeycomb structure with pores inside the partition walls are suppressed. In the present invention, by adjusting the compounding ratio of the raw materials for manufacturing a honeycomb structure, the particle diameter of the raw materials, firing conditions upon firing, and the like, not only the aforementioned porosity y (%) and average pore size x (μm), but also a honeycomb structure as described below can be obtained by the aforementioned knowledge. That is, in the honeycomb structure of the present embodiment, it is preferable to control the crystal growth of cordierite, the micro crack amount, size of pores exposed to the surface of the honeycomb substrate, the amount of the pores, and the communication of the pores with pores inside the partition walls. This enables to obtain a honeycomb structure having excellent catalyst coatability, light-off performance, and thermal shock resistance and having actually usable canning strength.

The honeycomb structure of the present embodiment may be provided with plugging portions disposed to seal one of the opening portion of each cell of the honeycomb structure. A honeycomb structure constituted in such a manner can be used as a filter for removing particulate matter contained in exhaust gas.

In the honeycomb structure of the present embodiment, a catalyst may be loaded on the partition walls and in the pores of the partition walls to obtain a honeycomb catalyst body, which can be used for purifying exhaust gas emitted from an internal combustion engine or the like. That is, the honeycomb structure of the present embodiment can suitably be used as a catalyst carrier for loading a catalyst.

Though there is no particular limitation on the kind of the catalyst, a three-way catalyst consisting of γ alumina, a noble metal, and a promoter may be mentioned. As the above noble metal, platinum (Pt), rhodium (Rh), and the like may be mentioned. As the aforementioned promoter, ceria, zirconia, and the like may be mentioned.

There is no particular limitation on the amount of the catalyst loaded on the partition walls. For example, the catalyst loading amount is preferably 10 to 300 g/L, more preferably 50 to 250 g/L. The aforementioned "loading amount (g/L)" means the mass (g) of a catalyst loaded per volume 1 L (1 liter) of a honeycomb structure as a catalyst carrier.

The honeycomb catalyst body having a catalyst loaded thereon is used as an exhaust gas treatment apparatus by holding in a metal can with a holding material (mat). The honeycomb catalyst body held in a metal can (i.e., exhaust gas treatment apparatus) is installed in the exhaust system (exhaust gas passage) of an automobile or the like.

(2) Method for Manufacturing Honeycomb Structure:

Next, an example of a method for manufacturing the honeycomb structure (manufacturing method of the honeycomb structure) of the present embodiment will be described. As the manufacturing method of a honeycomb structure of the present embodiment, a manufacturing method provided with a kneaded material preparation step, a forming step, and a firing step can be mentioned. The kneaded material preparation step is a step of obtaining kneaded material by mixing and kneading a raw material containing a ceramic raw material. The forming step is a step of obtaining a honeycomb formed body by kneaded material obtained in the kneaded material preparation step into a honeycomb shape. The firing step is a step of obtaining a honeycomb structure provided with porous partition walls separating and forming plurality of cells functioning as fluid passages by drying and firing a honeycomb formed body obtained in the forming step.

In the aforementioned kneaded material preparation step, it is preferable to adjust the particle diameter and the compounding formulation of the ceramic raw material used as a raw material. In addition, the particle diameter of the pore former added to the raw material may be adjusted.

For example, the average particle diameter of the ceramic raw material is preferably 10 μm or less, more preferably 6 μm or less. The average particle size of the ceramic raw material means a median size (d50) in a distribution of particle diameter of a ceramic raw material.

Hereinbelow, the manufacturing method of a honeycomb structure of the present embodiment will be described in more detail by each manufacturing step.

(2-1) Kneaded Material Preparation Step:

In the first place, upon manufacturing a honeycomb structure of the present embodiment, the raw material containing a ceramic raw material is mixed and kneaded to obtain kneaded material (kneaded material preparation step).

As a ceramic raw material contained in a raw material, a cordierite forming raw material is preferable. A cordierite forming raw material is a ceramic raw material which has a chemical composition of 42 to 56 mass % of silica, 30 to 45 mass % of alumina, and 12 to 16 mass % of magnesia and which becomes cordierite by firing. Alternatively the ceramic raw material contained in the raw material may be at least one kind selected from the group consisting of cordierite, silicon carbide, aluminum titanate, zeolite, and mullite.

The raw material is preferably prepared by further adding a pore former, a dispersion medium, an organic binder, an inorganic binder, surfactant, and the like to the aforementioned ceramic raw material. There is no particular limitation on the composition ratio of the additional materials, and it is preferable to determine the composition ratio according to the structure, material, and the like of a honeycomb structure to be manufactured.

As the pore former, it is preferable to use polymethylmethacrylate (PMMA), starch, carbon, foaming resin, water-absorbing resin, or a combination thereof. The average particle size of the pore former is preferably 0.5 to 10 µm, more preferably 1 to 5 µm. The average particle size of the pore former means median size (d50) in a distribution of a particle size of particles constituting the pore former. The amount of the pore former to be added is preferably 0.1 to 55 parts by mass, more preferably 0.5 to 50 parts by mass, and particularly preferably 1 to 40 parts by mass with respect to 100 parts by mass of the main raw materials (e.g., ceramic raw material contained in the raw material).

As the dispersion medium, water can be used. The amount of the dispersion medium to be added is preferably 30 to 150 parts by mass with respect to 100 parts by mass of the ceramic raw material.

Preferable examples of the organic binder include a methyl cellulose, hydroxypropylmethyl cellulose, hydroxypropylethyl cellulose, hydroxyethyl cellulose, carboxymethyl cellulose, polyvinyl alcohol, and a combination thereof. In addition, the amount of the organic binder to be added is preferably 1 to 10 parts by mass with respect to 100 parts by mass of the ceramic raw material.

As the surfactant, there may be used ethylene glycol, dextrin, fatty acid soap (e.g., potassium laurate soap), polyalcohol, or the like. These may be used alone or as a combination of two or more kinds. The amount of surfactant to be added is preferably 0.1 to 5 parts by mass with respect to 100 parts by mass of the ceramic raw material.

There is no particular limitation on the method for preparing kneaded material by kneading the raw material, and, for example, a method using a kneader, a vacuum kneader, or the like may be employed.

(2-2) Forming Step:

Next, the kneaded material obtained above is formed into a honeycomb shape to obtain a honeycomb formed body (forming step). There is no particular limitation on the method for forming a honeycomb formed body by forming the kneaded material, and a known forming method such as extrusion or injection may be employed. A suitable example is a method where a honeycomb formed body is formed by extrusion using a die having a desired cell shape, partition wall thickness, and cell density. As a material for the die, a superhard alloy, which hardly abrades away, is preferable.

There is no particular limitation on the shape of the honeycomb formed body, and preferred shapes are a circular cylindrical shape, a cylindrical shape having elliptic end faces, a columnar shape having end faces each having a polygonal shape such as "a square, a rectangle, a triangle, a pentagon, a hexagon, an octagon, and the like".

(2-3) Drying Step:

Next, the honeycomb formed body obtained above is dried (drying step). Though there is no particular limitation on the drying method, and examples of the drying method include hot air drying, microwave drying, dielectric drying, reduced pressure drying, vacuum drying, and freeze drying. Of these, it is preferable to perform dielectric drying, microwave drying, or hot air drying alone or as a combination thereof.

(2-4) Firing Step:

Next, a honeycomb formed body dried above is fired to obtain a honeycomb structure provided with porous partition walls separating and forming a plurality of cells functioning as fluid passages (firing step). Thus, there can successfully be manufactured a honeycomb structure having large pores in comparison with a conventional honeycomb structure in the partition walls.

The firing (main firing) of the honeycomb formed body is performed in order to secure predetermined strength by densification by sintering a raw material constituting a calcined formed body. Since the firing conditions (temperature, time, and atmosphere) are different depending on the kind of the raw material, appropriate conditions may be selected according to the kinds. For example, when a cordierite forming raw material is used, the firing temperature is preferably 1350 to 1450° C., more preferably 1380 to 1440° C. In addition, the firing time is preferably 3 to 10 hours as the maximum temperature-keeping time. When the firing is performed, it is preferable that the temperature rise rate from 1000° C. to the temperature 10° C. be low the maximum temperature is set to 10 to 300° C./hr. and that the temperature rise rate from the temperature 10° C. below the maximum temperature to the maximum temperature is set to 1 to 50° C./hr. By specifying the temperature rise rate from 1000° C. to the temperature of the maximum temperature −10° C. and the temperature rise rate from the temperature 10° C. below the maximum temperature to the maximum temperature to the aforementioned value ranges, the average pore size of a honeycomb structure can be controlled arbitrarily with maintaining productivity in firing, and generation of a meltdown defect by firing with extreme temperature rise can be inhibited. Though the apparatus for the calcination and the main firing is not particularly limited, an electric furnace, a gas furnace, or the like may be employed.

EXAMPLE

Hereinbelow, the present invention will be described more specifically with Examples. However, the present invention is by no means limited to these Examples.

Example 1

In Example 1, a cordierite forming raw material was used as the ceramic raw material, polymethylmethacrylate (PMMA) was used as the pore former to prepare kneaded material, the kneaded material was extruded to obtain a honeycomb formed body, and the honeycomb formed body was fired to obtain a honeycomb structure.

Specifically, talc, kaolin, calcined kaolin, aluminum hydroxide, boehmite, and fused silica were mixed to prepare a cordierite forming raw material. Table 1 shows a compounding formulation for the cordierite forming raw material in Example 1. The compounding formulation of the cordierite forming raw material in Example 1 is "batch No. 2". Table 2 shows the average particle diameter of each raw material constituting the cordierite forming raw material. The average particle size of each raw material means a median size (d50) in the distribution of the particle diameters of each raw material.

Next, to the cordierite forming raw material, a dispersion medium and polymethylmethacrylate (PMMA) were added, and they were mixed and kneaded to obtain a kneaded raw material having plasticity. The kneaded raw material having plasticity was formed into a cylindrical kneaded material by a vacuum kneader, and the kneaded material was put in an extruder and formed into a honeycomb shape to obtain a honeycomb formed body.

As the size of the fired body (i.e., honeycomb structure) after the firing of the honeycomb formed body, the diameter of end face was 93 mm, and the length in the cell extending direction was 90 mm. In addition, the partition wall thickness was 114 μm, and the cell density was 62 cells/cm$^2$.

TABLE 1

| Batch No. | Composition ratio of cordierite forming raw material (mass %) | | | | | | PMMA (mass %) | Water-absorbing resin (mass %) |
|---|---|---|---|---|---|---|---|---|
| | Talc | Kaolin | Calcined kaolin | Aluminum hydroxide | Boehmite | Fused silica | | |
| 1 | 40 | 20 | 10 | 12.5 | 12.5 | 5 | — | — |
| 2 | 40 | 20 | 10 | 12.5 | 12.5 | 5 | 5 | — |
| 3 | 40 | 20 | 10 | 12.5 | 12.5 | 5 | 10 | — |
| 4 | 40 | 20 | 10 | 12.5 | 12.5 | 5 | 20 | — |
| 5 | 40 | 20 | 10 | 12.5 | 12.5 | 5 | 30 | — |
| 6 | 40 | 20 | 10 | 12.5 | 12.5 | 5 | 40 | — |
| 7 | 40 | 20 | 10 | 12.5 | 12.5 | 5 | 50 | — |
| 8 | 40 | 20 | 10 | 12.5 | 12.5 | 5 | 60 | — |
| 9 | 40 | 20 | 10 | 12.5 | 12.5 | 5 | — | — |
| 10 | 40 | 20 | 10 | 12.5 | 12.5 | 5 | 5 | — |
| 11 | 40 | 20 | 10 | 12.5 | 12.5 | 5 | 10 | — |
| 12 | 40 | 20 | 10 | 12.5 | 12.5 | 5 | 20 | — |
| 13 | 40 | 20 | 10 | 12.5 | 12.5 | 5 | 30 | — |
| 14 | 40 | 20 | 10 | 12.5 | 12.5 | 5 | 40 | — |
| 15 | 40 | 20 | 10 | 12.5 | 12.5 | 5 | — | 2 |
| 16 | 40 | 20 | 10 | 12.5 | 12.5 | 5 | — | 4 |
| 17 | 40 | 20 | 10 | 12.5 | 12.5 | 5 | — | 6 |
| 18 | 40 | 20 | 10 | 12.5 | 12.5 | 5 | — | 8 |
| 19 | 40 | 20 | 10 | 12.5 | 12.5 | 5 | — | 10 |

TABLE 2

| Batch No. | Average particle diameter of cordierite forming raw material | | | | | | Average particle diameter of PMMA | Average particle diameter of water-absorbing resin |
|---|---|---|---|---|---|---|---|---|
| | Talc | Kaolin | Calcined kaolin | Aluminum hydroxide | Boehmite | Fused silica | | |
| 1 | 2 μm | 5 μm | 1 μm | 1 μm | 0.5 μm | 2 μm | — | — |
| 2 | 2 μm | 5 μm | 1 μm | 1 μm | 0.5 μm | 2 μm | 1 μm | — |
| 3 | 2 μm | 5 μm | 1 μm | 1 μm | 0.5 μm | 2 μm | 1 μm | — |
| 4 | 2 μm | 5 μm | 1 μm | 1 μm | 0.5 μm | 2 μm | 1 μm | — |
| 5 | 2 μm | 5 μm | 1 μm | 1 μm | 0.5 μm | 2 μm | 1 μm | — |
| 6 | 2 μm | 5 μm | 1 μm | 1 μm | 0.5 μm | 2 μm | 1 μm | — |
| 7 | 2 μm | 5 μm | 1 μm | 1 μm | 0.5 μm | 2 μm | 1 μm | — |
| 8 | 2 μm | 5 μm | 1 μm | 1 μm | 0.5 μm | 2 μm | 1 μm | — |
| 9 | 5 μm | 5 μm | 1 μm | 1 μm | 0.5 μm | 2 μm | — | — |
| 10 | 5 μm | 5 μm | 1 μm | 1 μm | 0.5 μm | 2 μm | 4 μm | — |
| 11 | 5 μm | 5 μm | 1 μm | 1 μm | 0.5 μm | 2 μm | 4 μm | — |
| 12 | 5 μm | 5 μm | 1 μm | 1 μm | 0.5 μm | 2 μm | 4 μm | — |
| 13 | 5 μm | 5 μm | 1 μm | 1 μm | 0.5 μm | 2 μm | 4 μm | — |
| 14 | 5 μm | 5 μm | 1 μm | 1 μm | 0.5 μm | 2 μm | 4 μm | — |
| 15 | 5 μm | 5 μm | 1 μm | 1 μm | 0.5 μm | 2 μm | — | 5 μm |
| 16 | 5 μm | 5 μm | 1 μm | 1 μm | 0.5 μm | 2 μm | — | 5 μm |
| 17 | 5 μm | 5 μm | 1 μm | 1 μm | 0.5 μm | 2 μm | — | 5 μm |
| 18 | 5 μm | 5 μm | 1 μm | 1 μm | 0.5 μm | 2 μm | — | 5 μm |
| 19 | 5 μm | 5 μm | 1 μm | 1 μm | 0.5 μm | 2 μm | — | 5 μm |

Next, after the formed body was dried, it was fired under the firing conditions A shown in Table 3 to manufacture a honeycomb structure (Example 1). Table 3 shows firing conditions.

TABLE 3

| | Temperature rise rate (° C./hr.) | | | | |
|---|---|---|---|---|---|
| Firing condition | 1000° C.-1250° C. | 1250° C.-(10 below maximum temperature) ° C. | (10 below maximum temperature) ° C.-Maximum temperature | Maximum temperature (° C.) | Retention time (hour) |
| A | 100 | 10 | 10 | 1390 | 10 |
| B | 100 | 10 | 10 | 1410 | 10 |
| C | 100 | 10 | 10 | 1430 | 10 |
| D | 100 | 50 | 10 | 1390 | 10 |
| E | 100 | 50 | 10 | 1410 | 10 |
| F | 100 | 50 | 10 | 1430 | 10 |
| G | 100 | 100 | 10 | 1390 | 10 |
| H | 100 | 100 | 10 | 1410 | 10 |

The porosity (%), average pore size (μm), and thermal expansion coefficient ($10^{-6} \times$ ° C.) of the honeycomb structure (Example 1) were measured. The porosity and the average pore size are values measured by mercury porosimetry.

The honeycomb structure (Example 1) was evaluated for the A-axis compressive strength, catalyst coatability, HC amount in exhaust gas at 200 seconds after the start of driving, thermal shock resistance before loading a catalyst, and thermal shock resistance after loading a catalyst by the following methods. In addition, from the evaluation result of the HC amount in exhaust gas at 200 seconds after the start of driving, evaluation of light-off was performed. Tables 4 to 7 show the evaluation results of the A-axis compressive strength, catalyst coatability, HC amount in exhaust gas at 200 seconds after the start of driving, light-off, thermal shock resistance before loading a catalyst, and thermal shock resistance after loading a catalyst. Tables 8 to 10 show the evaluation results of the A-axis compressive strength, catalyst coatability, HC amount in exhaust gas at 200 seconds after the start of driving, light-off, thermal shock resistance before loading a catalyst, and thermal shock resistance after loading a catalyst of Comparative Examples 1 to 36 described later.

TABLE 4

| | Batch No. | Firing condition | Porosity (%) | Average pore size (μm) | Thermal expansion coefficient ($10^{-6}$/° C.) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Example 1 | 2 | A | 36.6 | 0.5 | 0.6 | 19.5 | ○ | 0.97 | ○ | ○ | ○ |
| Example 2 | 3 | A | 41.4 | 0.6 | 0.6 | 16.7 | ○ | 0.95 | ○ | ○ | ○ |
| Example 3 | 4 | A | 47.8 | 0.7 | 0.7 | 14.9 | ○ | 0.91 | ○ | ○ | ○ |
| Example 4 | 5 | A | 55.0 | 0.9 | 0.7 | 11.3 | ○ | 0.87 | ○ | ○ | ○ |
| Example 5 | 6 | A | 62.4 | 0.9 | 0.7 | 9.0 | ○ | 0.83 | ○ | ○ | ○ |
| Example 6 | 7 | A | 68.4 | 1.1 | 0.8 | 6.6 | ○ | 0.79 | ○ | ○ | ○ |
| Example 7 | 2 | B | 36.5 | 1.3 | 0.4 | 16.1 | ○ | 0.97 | ○ | ○ | ○ |
| Example 8 | 3 | B | 41.5 | 1.4 | 0.4 | 14.5 | ○ | 0.95 | ○ | ○ | ○ |
| Example 9 | 4 | B | 47.6 | 1.5 | 0.5 | 11.4 | ○ | 0.91 | ○ | ○ | ○ |
| Example 10 | 5 | B | 55.1 | 1.7 | 0.5 | 8.8 | ○ | 0.87 | ○ | ○ | ○ |
| Example 11 | 6 | B | 62.1 | 1.9 | 0.6 | 7.3 | ○ | 0.83 | ○ | ○ | ○ |
| Example 12 | 7 | B | 68.7 | 2.1 | 0.7 | 5.1 | ○ | 0.79 | ○ | ○ | ○ |

TABLE 5

| | Batch No. | Firing condition | Porosity (%) | Average pore size (μm) | Thermal expansion coefficient ($10^{-6}$/° C.) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Example 13 | 2 | C | 36.5 | 2.3 | 0.3 | 12.9 | ○ | 0.97 | ○ | ○ | ○ |
| Example 14 | 3 | C | 41.4 | 2.4 | 0.4 | 10.8 | ○ | 0.95 | ○ | ○ | ○ |
| Example 15 | 4 | C | 48.0 | 2.5 | 0.4 | 6.9 | ○ | 0.91 | ○ | ○ | ○ |
| Example 16 | 5 | C | 55.3 | 2.6 | 0.5 | 6.7 | ○ | 0.87 | ○ | ○ | ○ |
| Example 17 | 6 | C | 62.2 | 2.7 | 0.5 | 5.3 | ○ | 0.83 | ○ | ○ | ○ |
| Example 18 | 10 | A | 38.0 | 3.2 | 0.4 | 11.3 | ○ | 0.97 | ○ | ○ | ○ |
| Example 19 | 11 | A | 42.6 | 3.3 | 0.4 | 10.1 | ○ | 0.94 | ○ | ○ | ○ |

TABLE 5-continued

| | Batch No. | Firing condition | Porosity (%) | Average pore size (μm) | Thermal expansion coefficient ($10^{-6}/°C$) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Example 20 | 12 | A | 50.1 | 3.5 | 0.4 | 6.8 | ○ | 0.90 | ○ | ○ | ○ |
| Example 21 | 10 | B | 37.5 | 4.0 | 0.3 | 10.4 | ○ | 0.97 | ○ | ○ | ○ |
| Example 22 | 11 | B | 42.0 | 4.2 | 0.4 | 7.1 | ○ | 0.94 | ○ | ○ | ○ |
| Example 23 | 12 | B | 50.0 | 4.4 | 0.4 | 5.2 | ○ | 0.90 | ○ | ○ | ○ |
| Example 24 | 10 | C | 37.2 | 4.8 | 0.2 | 8.1 | ○ | 0.97 | ○ | ○ | ○ |
| Example 25 | 11 | C | 42.4 | 4.9 | 0.3 | 7.0 | ○ | 0.94 | ○ | ○ | ○ |

TABLE 6

| | Batch No. | Firing condition | Porosity (%) | Average pore size (μm) | Thermal expansion coefficient ($10^{-6}/°C$) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Example 26 | 2 | D | 36.0 | 1.1 | 0.5 | 18.0 | ○ | 0.98 | ○ | ○ | ○ |
| Example 27 | 3 | D | 42.0 | 1.2 | 0.5 | 14.9 | ○ | 0.94 | ○ | ○ | ○ |
| Example 28 | 4 | D | 47.9 | 1.3 | 0.5 | 12.3 | ○ | 0.91 | ○ | ○ | ○ |
| Example 29 | 5 | D | 54.9 | 1.4 | 0.6 | 9.7 | ○ | 0.87 | ○ | ○ | ○ |
| Example 30 | 6 | D | 61.8 | 1.7 | 0.6 | 7.6 | ○ | 0.83 | ○ | ○ | ○ |
| Example 31 | 7 | D | 69.0 | 1.9 | 0.7 | 5.2 | ○ | 0.79 | ○ | ○ | ○ |
| Example 32 | 2 | E | 36.6 | 2.1 | 0.4 | 14.8 | ○ | 0.97 | ○ | ○ | ○ |
| Example 33 | 3 | E | 41.8 | 2.2 | 0.4 | 12.1 | ○ | 0.94 | ○ | ○ | ○ |
| Example 34 | 4 | E | 48.0 | 2.3 | 0.4 | 9.3 | ○ | 0.91 | ○ | ○ | ○ |
| Example 35 | 5 | E | 55.5 | 2.4 | 0.5 | 8.0 | ○ | 0.87 | ○ | ○ | ○ |
| Example 36 | 6 | E | 62.4 | 2.5 | 0.5 | 6.2 | ○ | 0.83 | ○ | ○ | ○ |
| Example 37 | 2 | F | 36.0 | 3.1 | 0.3 | 13.5 | ○ | 0.98 | ○ | ○ | ○ |
| Example 38 | 3 | F | 41.8 | 3.2 | 0.4 | 11.4 | ○ | 0.94 | ○ | ○ | ○ |
| Example 39 | 4 | F | 47.1 | 3.3 | 0.4 | 7.9 | ○ | 0.91 | ○ | ○ | ○ |
| Example 40 | 5 | F | 54.8 | 3.4 | 0.5 | 7.3 | ○ | 0.87 | ○ | ○ | ○ |

TABLE 7

| | Batch No. | Firing condition | Porosity (%) | Average pore size (μm) | Thermal expansion coefficient ($10^{-6}/°C$) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Example 41 | 2 | G | 36.4 | 1.8 | 0.3 | 11.7 | ○ | 0.98 | ○ | ○ | ○ |
| Example 42 | 3 | G | 42.0 | 1.9 | 0.3 | 9.2 | ○ | 0.94 | ○ | ○ | ○ |
| Example 43 | 4 | G | 48.0 | 2.0 | 0.4 | 6.1 | ○ | 0.91 | ○ | ○ | ○ |
| Example 44 | 5 | G | 55.8 | 2.2 | 0.4 | 5.6 | ○ | 0.87 | ○ | ○ | ○ |
| Example 45 | 6 | G | 62.2 | 2.3 | 0.5 | 4.5 | ○ | 0.83 | ○ | ○ | ○ |
| Example 46 | 2 | H | 36.0 | 2.9 | 0.2 | 10.6 | ○ | 0.98 | ○ | ○ | ○ |
| Example 47 | 3 | H | 42.0 | 3.0 | 0.3 | 8.5 | ○ | 0.94 | ○ | ○ | ○ |
| Example 48 | 4 | H | 47.4 | 3.1 | 0.3 | 6.0 | ○ | 0.91 | ○ | ○ | ○ |
| Example 49 | 5 | H | 55.2 | 3.2 | 0.4 | 5.3 | ○ | 0.87 | ○ | ○ | ○ |

TABLE 8

| | Batch No. | Firing condition | Porosity (%) | Average pore size (μm) | Thermal expansion coefficient ($10^{-6}/°C$) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Comp. Ex. 1 | 1 | A | 32.0 | 0.4 | 0.5 | 20.7 | x | 1.00 | x | ○ | ○ |
| Comp. Ex. 2 | 8 | A | 72.5 | 1.3 | 0.9 | 4.9 | ○ | *1 | *1 | ○ | x |
| Comp. Ex. 3 | 1 | B | 32.1 | 1.2 | 0.3 | 18.4 | ○ | 1.00 | x | ○ | ○ |
| Comp. Ex. 4 | 8 | B | 72.7 | 2.2 | 0.8 | 4.0 | ○ | *1 | *1 | ○ | x |
| Comp. Ex. 5 | 1 | C | 32.2 | 2.1 | 0.2 | 14.8 | ○ | 1.00 | x | ○ | ○ |
| Comp. Ex. 6 | 7 | C | 68.4 | 2.9 | 0.7 | 4.2 | ○ | *1 | *1 | ○ | x |

TABLE 8-continued

| | Batch No. | Firing condition | Porosity (%) | Average pore size (μm) | Thermal expansion coefficient (10⁻⁶/° C.) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Comp. Ex. 7 | 8 | C | 72.8 | 3.1 | 0.7 | 3.4 | ○ | *1 | *1 | x | x |
| Comp. Ex. 8 | 9 | A | 34.0 | 3.0 | 0.3 | 12.6 | ○ | 0.99 | x | ○ | ○ |
| Comp. Ex. 9 | 13 | A | 56.7 | 3.7 | 0.5 | 4.9 | ○ | 0.86 | ○ | ○ | x |
| Comp. Ex. 10 | 14 | A | 64.0 | 3.8 | 0.6 | 4.0 | ○ | 0.82 | ○ | ○ | x |

TABLE 9

| | Batch No. | Firing condition | Porosity (%) | Average pore size (μm) | Thermal expansion coefficient (10⁻⁶/° C.) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Comp. Ex. 11 | 9 | B | 33.9 | 3.9 | 0.3 | 11.7 | ○ | 0.99 | x | ○ | ○ |
| Comp. Ex. 12 | 13 | B | 56.7 | 4.5 | 0.5 | 4.5 | ○ | 0.86 | ○ | ○ | x |
| Comp. Ex. 13 | 14 | B | 63.6 | 4.8 | 0.6 | 3.7 | ○ | 0.82 | ○ | ○ | x |
| Comp. Ex. 14 | 9 | C | 33.6 | 4.6 | 0.1 | 10.4 | ○ | 0.99 | x | ○ | ○ |
| Comp. Ex. 15 | 12 | C | 50.4 | 5.2 | 0.3 | 4.6 | ○ | 0.90 | ○ | ○ | x |
| Comp. Ex. 16 | 13 | C | 56.8 | 5.3 | 0.4 | 4.0 | ○ | 0.86 | ○ | ○ | x |
| Comp. Ex. 17 | 14 | C | 63.7 | 5.5 | 0.5 | 3.4 | ○ | 0.82 | ○ | ○ | x |
| Comp. Ex. 18 | 9 | H | 33.2 | 5.3 | 0.1 | 7.7 | ○ | 0.99 | x | ○ | ○ |
| Comp. Ex. 19 | 10 | H | 37.0 | 5.5 | 0.1 | 4.9 | ○ | 0.97 | ○ | ○ | ○ |
| Comp. Ex. 20 | 11 | H | 41.6 | 5.8 | 0.2 | 3.9 | ○ | 0.95 | ○ | ○ | x |

TABLE 10

| | Batch No. | Firing condition | Porosity (%) | Average pore size (μm) | Thermal expansion coefficient (10⁻⁶/° C.) | A-axis compressive strength (MPa) | Catalyst coatability | HC amount in exhaust gas at 200 seconds after start of driving | light-off | Thermal shock resistance before catalyst is loaded | Thermal shock resistance after catalyst is loaded |
|---|---|---|---|---|---|---|---|---|---|---|---|
| Comp. Ex. 21 | 1 | D | 32.1 | 0.9 | 0.4 | 19.0 | x | 1.00 | x | ○ | ○ |
| Comp. Ex. 22 | 8 | D | 73.1 | 2.1 | 0.8 | 4.1 | ○ | *1 | *1 | x | x |
| Comp. Ex. 23 | 1 | E | 32.1 | 2.0 | 0.2 | 16.9 | ○ | 1.00 | x | ○ | ○ |
| Comp. Ex. 24 | 7 | E | 68.6 | 2.7 | 0.7 | 4.7 | ○ | 0.79 | ○ | ○ | x |
| Comp. Ex. 25 | 8 | E | 72.9 | 2.8 | 0.8 | 3.8 | ○ | *1 | *1 | x | x |
| Comp. Ex. 26 | 1 | F | 31.5 | 3.0 | 0.2 | 15.4 | ○ | 1.00 | x | ○ | ○ |
| Comp. Ex. 27 | 6 | F | 61.7 | 3.5 | 0.5 | 5.5 | ○ | 0.83 | ○ | ○ | ○ |
| Comp. Ex. 28 | 7 | F | 67.5 | 3.6 | 0.7 | 4.4 | ○ | 0.80 | ○ | ○ | x |
| Comp. Ex. 29 | 8 | F | 71.6 | 3.7 | 0.7 | 3.5 | ○ | *1 | *1 | x | x |
| Comp. Ex. 30 | 1 | G | 32.1 | 1.7 | 0.2 | 12.9 | ○ | 1.00 | x | ○ | ○ |
| Comp. Ex. 31 | 7 | G | 68.7 | 2.5 | 0.6 | 3.5 | ○ | *1 | *1 | ○ | x |
| Comp. Ex. 32 | 8 | G | 73.1 | 2.6 | 0.7 | 2.6 | ○ | *1 | *1 | x | x |
| Comp. Ex. 33 | 1 | H | 31.9 | 2.8 | 0.1 | 12.2 | ○ | 1.00 | x | ○ | ○ |
| Comp. Ex. 34 | 6 | H | 61.8 | 3.3 | 0.5 | 4.1 | ○ | 0.83 | ○ | ○ | x |
| Comp. Ex. 35 | 7 | H | 68.1 | 3.4 | 0.6 | 2.9 | ○ | *1 | *1 | ○ | x |
| Comp. Ex. 36 | 8 | H | 72.0 | 3.5 | 0.7 | 2.0 | ○ | *1 | *1 | x | x |

[A-Axis Compressive Strength]

A-axis compressive strength is compressive strength (MPa) provided in JASO standard M505-87, which is an automotive standard issued by the Society of Automotive Engineers of Japan. Specifically, it is fracture strength when a compressive load is applied to the honeycomb structure in the passage direction, and the pressure at the time that the honeycomb structure is fractured is determined as "A-axis compressive strength". Since the strength is hardly susceptible to deformation of partition walls, it represents the material strength.

[Catalyst Coatability]

The honeycomb structure was coated with catalyst slurry containing a catalyst component, and the catalyst coatability was evaluated. Specifically, a three-way catalyst (a catalyst containing γ alumina carrying a platinum group metal where the ratio of platinum (Pt) and rhodium (Rh) (Pt:Rh) is adjusted to 4:1) was slurried using water and a dispersant. Next, using the catalyst slurry obtained above, a catalyst was loaded on a honeycomb structure to obtain a honeycomb structure having a catalyst loaded thereon. The loading of the catalyst was performed according to the following method. In the first place, a honeycomb structure was immersed in the catalyst slurry to allow the catalyst slurry to adsorb to the honeycomb structure. Next, the excessive catalyst slurry adsorbing to the honeycomb structure was blown away by compressed air. Next, the honeycomb structure where the slurry adsorbs was heat-dried. The adsorption of the catalyst slurry, blowing away by compressive air, and heat-drying were repeated until 100 g/L of the catalyst after drying was coated on the honeycomb structure to obtain a honeycomb structure having a catalyst loaded thereon. The catalyst used had a particle diameter of 5 µm. Then, a hot vibration test was performed by repeating 100 cycles of heating and cooling, with heating from 100 to 900° C. and cooling from 900 to 100° C. as one cycle with applying vibrations of a frequency of 200 Hz and an acceleration of 20 G. The case that the weight reduction after the test is below 1% of the loaded catalyst amount was evaluated as "pass (o)", and the case of 1% or more was evaluated as "rejection (x)".

[HC Amount in Exhaust Gas at 200 Seconds after the Start of Driving]

The honeycomb structure having the catalyst loaded thereon was mounted in exhaust system of a vehicle with a 2000-cc gasoline engine. Upon emission regulation mode (JC-08) driving, exhaust gas was sampled from a pipe connected to the exhaust pipe, and the HC amount in the exhaust gas was measured by a modal mass method to obtain the HC concentration at 200 seconds after the start of driving. The HC amount was measured according to the provision of JC-08. The results of the HC amount of a honeycomb structure in each of Examples and Comparative Examples were obtained by taking the ratio of the individual measurement to the HC amount of Comparative Example 1 described later as baseline "1.00". The ratio of the HC amount was determined as the "HC amount in exhaust gas at 200 seconds after the start of driving".

[Light-Off]

The light-off was evaluated by classifying the case of HC amount below 0.99 in the "HC amount in exhaust gas at 200 seconds after the start of driving" as "pass (o)" while the case of the HC amount 0.99 or more as "rejection (x)". In Table 8 and Table 10, *1 means that the material strength (A-axis compression strength) was low and that canning was impossible.

[Thermal Shock Resistance Before Loading Catalyst]

The thermal shock resistance test before loading a catalyst was carried out according to the method prescribed in JASO standard M-505-87 by putting a honeycomb structure before loading catalyst was loaded in an electric furnace where the temperature was set 700° C. higher than room temperature, after keeping at room temperature. Tree honeycomb structures were used for the test for each temperature. As the judgment criteria, the cases having no crack generation and no other abnormality and having no dull sound in a ping test for all the three honeycomb structures were judged as "pass (o)", and the other cases were judged as "rejection (x)". That is, the case having crack generation or the case having a dull sound in a hammering test in at least one honeycomb structure was judged as "rejection (x)".

[Thermal Shock Resistance after Loading Catalyst]

The test was carried out in the same manner as the aforementioned test of thermal shock resistance before catalyst loading except that the honeycomb structure after catalyst loading was used as a honeycomb structure for the test and the honeycomb structure was put in an electric furnace where the temperature was set 550° C. higher than room temperature.

Example 2 to 49

Each of the honeycomb structures of Examples 2 to 49 was manufactured in the same manner as in Example 1 except that the compounding formulation (batch No.) was changed as shown in Tables 1, 2, and 4 to 7 and that the firing conditions were changed as shown in Table 3 and Tables 4 to 7.

Comparative Example 1 to 36

Each of the honeycomb structures of Comparative Examples 1 to 36 was manufactured in the same manner as in Example 1 except that the compounding formulation (batch No.) was changed as shown in Tables 1, 2, and 8 to 10 and that the firing conditions were changed as shown in Table 3 and Tables 8 to 10.

Each of the honeycomb structures of Example 2 to 49 and Comparative Examples 1 to 36 were evaluated for the A-axis compressive strength, catalyst coatability, HC amount in exhaust gas at 200 seconds after the start of driving, and light-off. The results are shown in Tables 4 to 10.

Figure 4:
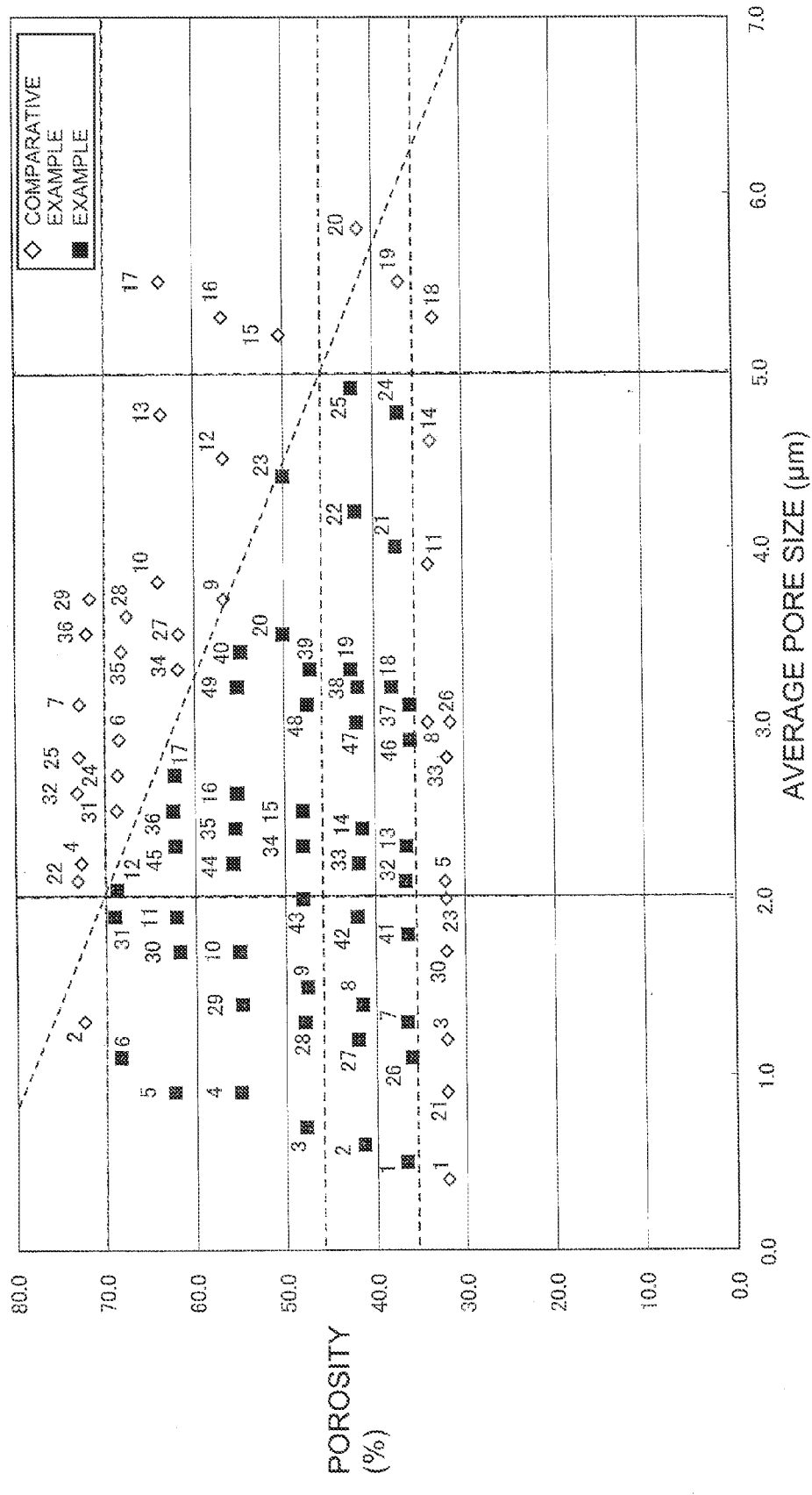
FIG. 4 is a graph showing a relation between porosity (%) and average pore size (μm) of each of the honeycomb structures of Examples and Comparative Examples.

In addition, the relation between the porosity (%) and the average pore size (µm) of each of the honeycomb structures of Examples and Comparative Examples is shown in FIG. 4. FIG. 4 shows a relation between porosity (%) and average pore size (µm) of each of the honeycomb structures of Examples and Comparative Examples. In FIG. 4, the horizontal axis shows average pore size (µm), and the vertical axis shows porosity (%).

(Result)

As shown in Tables 4 to 7, each of the honeycomb structures of Examples 1 to 49 had excellent catalyst coatability and small HC amount in exhaust gas at 200 seconds after the start of driving. Also, the good light-off result was shown. In addition, each of the honeycomb structures of Examples 1 to 49 showed sufficient A-axis compressive strength as a catalyst carrier.

Each of the honeycomb structures of Examples 1 to 49 could satisfy the aforementioned performances at the same time with maintaining a thermal expansion coefficient of $1.0 \times 10^{-6}$/° C. or less.

In each of the honeycomb structures of Comparative Examples 1 to 36, since the relation between porosity (%) and average pore size (µm) of the present invention is not satisfied as shown in FIG. 5, one of the A-axis compressive strength, catalyst coatability, and light-off performance was low. In other words, in order to improve thermal shock resistance, one of the aforementioned performances was sacrificed, and therefore the thermal shock resistance and the aforementioned performances could not be satisfied at the same time.

INDUSTRIAL APPLICABILITY

A honeycomb structure of the present invention can be used as a purification member for purifying exhaust gas.

What is claimed is:
1. A honeycomb structure comprising partition walls separating and forming a plurality of cells functioning as fluid passages,
wherein the partition walls are made of cordierite and are formed to have a thickness of 0.064 to 0.165 mm, and, when an average pore size of the partition walls is x (µm) while a porosity of the partition walls is y (%), a relation of x and y is y≤−8.33x+86.66 and satisfies 45≤y≤70 and 0.5≤x≤1.9.

2. The honeycomb structure according to claim 1, wherein the thermal shock resistance temperature is 650° C. or more.

3. The honeycomb structure according to claim 2, wherein A-axis compressive strength is 5.0 MPa or more.

4. The honeycomb structure according to claim 2, wherein the A-axis compressive strength is 7.0 MPa or more.

5. The honeycomb structure according to claim 1, wherein A-axis compressive strength is 5.0 MPa or more.

6. The honeycomb structure according to claim 1, wherein the A-axis compressive strength is 7.0 MPa or more.

7. The honeycomb structure according to claim 1, wherein the cells functioning as fluid passages are open on the inlet and outlet sides of the honeycomb structure.

8. The honeycomb structure according to claim 1, wherein the porosity of the partition walls satisfies $47.1 \leq y \leq 70$.

\* \* \* \* \*